United States Patent
Kameyama

(10) Patent No.: US 7,848,545 B2
(45) Date of Patent: Dec. 7, 2010

(54) METHOD OF AND SYSTEM FOR IMAGE PROCESSING AND COMPUTER PROGRAM

(75) Inventor: Hirokazu Kameyama, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 981 days.

(21) Appl. No.: 11/270,503

(22) Filed: Nov. 10, 2005

(65) Prior Publication Data

US 2006/0098256 A1    May 11, 2006

(30) Foreign Application Priority Data

Nov. 10, 2004 (JP) ............... 2004-326334

(51) Int. Cl.
*G06K 9/00* (2006.01)
(52) U.S. Cl. .................................. 382/118
(58) Field of Classification Search ............... None
See application file for complete search history.

(56) References Cited

U.S. PATENT DOCUMENTS

2003/0049027 A1* 3/2003 Umeda et al. ............ 396/89
2003/0071908 A1* 4/2003 Sannoh et al. ............ 348/345

FOREIGN PATENT DOCUMENTS

JP    2003-92726 A    3/2003
JP    2003-319169 A   11/2003

\* cited by examiner

*Primary Examiner*—Wes Tucker
*Assistant Examiner*—Elisa M Rice
(74) *Attorney, Agent, or Firm*—Sughrue Mion, PLLC

(57) ABSTRACT

A trimmed image is obtained by trimming for cutting out from a photographic image obtained by taking a photograph of an object including a reference part, and one or more other part which has a common centerline with the reference part and is arranged in a direction in which the centerline of the reference part extends, an image of an area including a part or the whole of the reference part and said other part along a trimming centerline. The centerline of the reference part is obtained and the degree and the direction of inclination of said other part are detected from the photographic image. The trimming centerline is inclined by a larger angle away from the centerline toward the direction of the inclination of said other part as the degree of inclination increases.

18 Claims, 13 Drawing Sheets

FIG.3
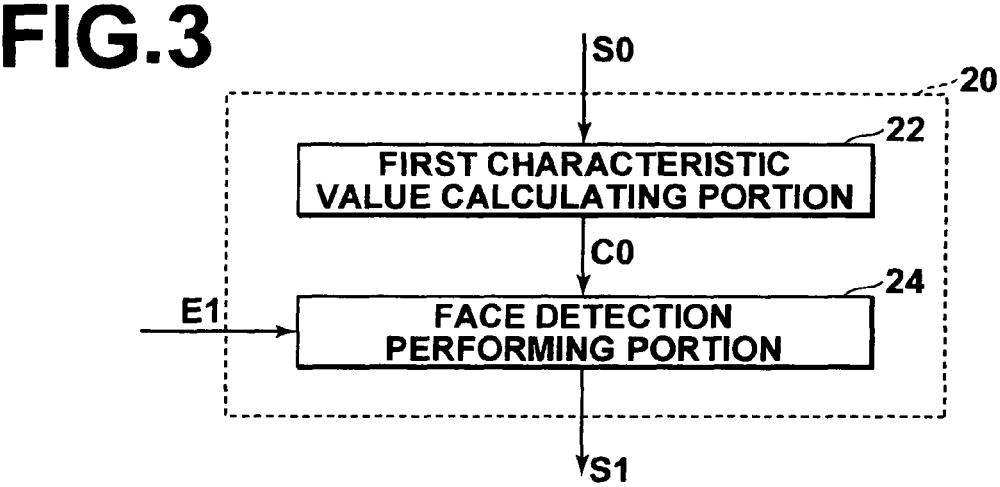
FIG.4
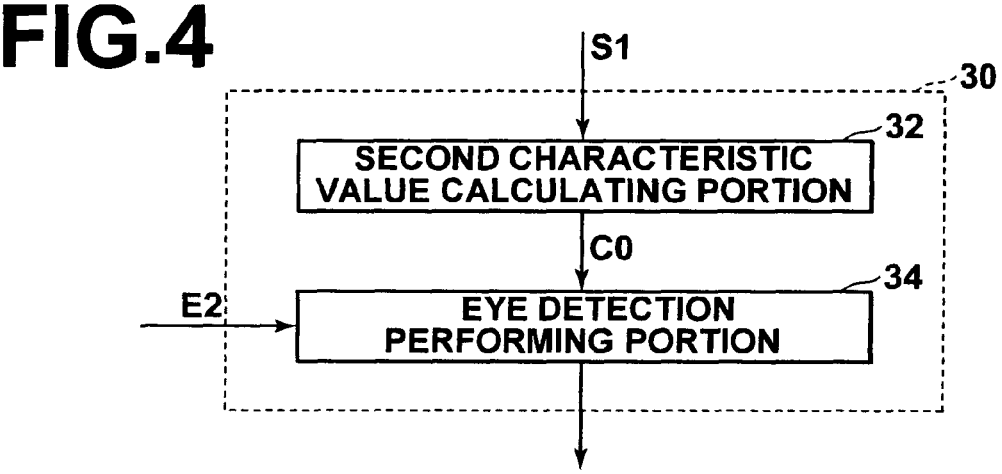
FIG.5A 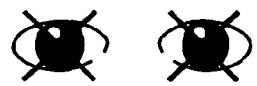 FIG.5B 
FIG.6A
| 1 | 1 | 1 |
|---|---|---|
| 0 | 0 | 0 |
| -1 | -1 | -1 |
FIG.6B
| 1 | 0 | -1 |
|---|---|---|
| 1 | 0 | -1 |
| 1 | 0 | -1 |

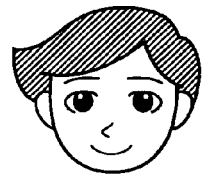
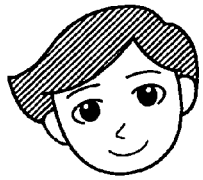
FIG.12A   FIG.12B   FIG.12C
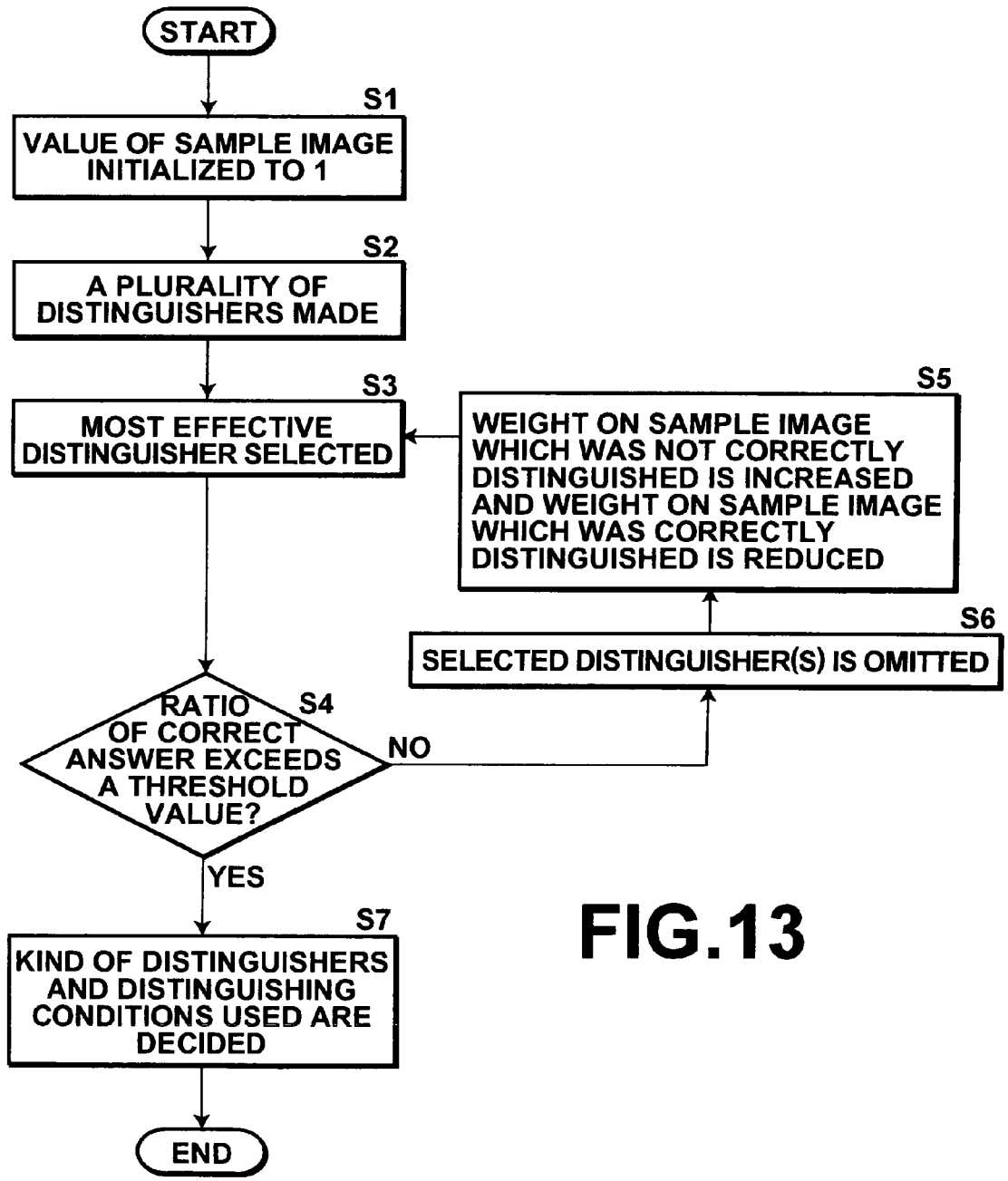
FIG.13

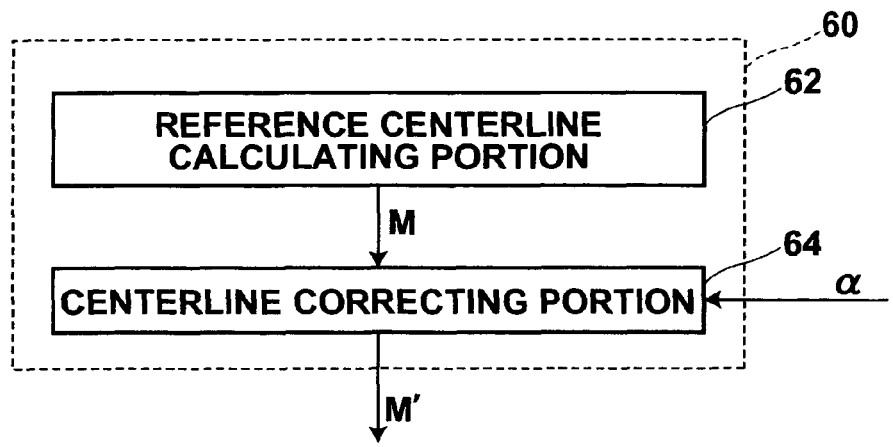
FIG.20
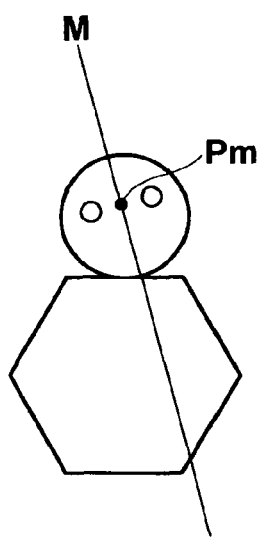 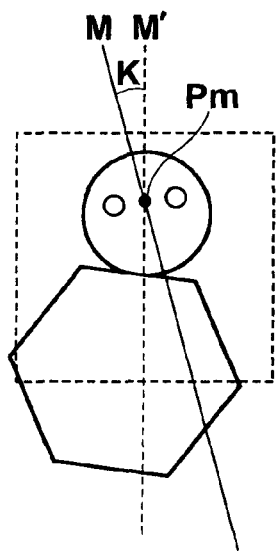 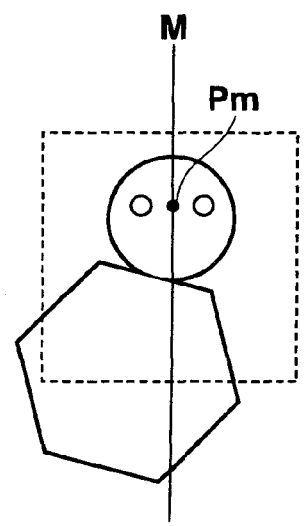
FIG.21A  FIG.21B  FIG.21C

US 7,848,545 B2

METHOD OF AND SYSTEM FOR IMAGE PROCESSING AND COMPUTER PROGRAM

BACKGROUND OF THE INVENTION

1. Field of the Invention

This invention relates to a method of and system for image processing for trimming, and more particularly, to a method of and system for image processing for trimming photographic images of objects comprising a plurality of parts. This invention further relates to a computer program for the image processing.

2. Description of the Related Art

For example, application of a passport or a license or making own personal history often requires a photograph of his or her face output in a predetermined standard (will be referred to as "a certification photograph", hereinbelow.) For this purpose, a studio for taking a photograph of the user has been provided and there has been used an automatic camera which automatically takes a photograph of the user seated on a chair in the studio and makes a certification photograph sheet on which a photograph of his or her face is recorded. Such an automatic photograph system is inconvenient in that the place of installment is limited since it is cumbersome, and the user has to find it and visit it in order to obtain the certification photograph.

In order to overcome this problem, it has been proposed to obtain the position of the face from the photographic image of the face employed in making a certification photograph, set a trimming area on the basis of the standard of the certification photograph so that the photographic image of the face is positioned in a predetermined position in the certification photograph, and cut out the image in the trimming area, thereby forming the certification photograph. With this method, the user can request a certification photograph of a DPE shop or the like which exists more than the automatic photograph systems and at the same time, the user can request a DPE shop or the like to make a certification photograph from a photograph which he or she favors.

From the characteristics of the certification photograph, it is necessary that the image of the whole face is in the trimming area and the trimming area is laterally symmetrical about the center of the image of the face. Accordingly, when setting the trimming area, generally, the centerline of the face is set to be the centerline of the trimming (will be referred to as "the trimming centerline", hereinbelow) and the area which is laterally symmetrical about the trimming centerline is set to be the trimming area. The centerline of the face may be a straight line joining the middle point between eyes, the center point of the nose and the center point of the mouth as disclosed in Japanese Unexamined Patent Publication No. 2003-092726 and the frame of the trimming area may be set so that the centerline of the face is taken as the trimming centerline and the vertical lines are parallel to the trimming centerline. With this method, even if the image of the face in the input photographic image is inclined (FIG. 21A), it is possible to set the image of the face not to be inclined (FIG. 21C).

However, the method disclosed in Japanese Unexamined Patent Publication No. 2003-092726 is disadvantageous in that, though it is possible to carry out trimming so that neither the image of the face nor the image of the trunk is inclined if the image of the face and the image of the trunk are inclined in substantially the same degree in substantially the same direction when taking the photograph, the trimmed image is bad in its balance as a whole e.g., the inclination of the image of the trunk can be very hard as shown in FIG. 21C or the image of the trunk can be abnormally small, when the photograph is trimmed with the centerline of the face taken as the trimming centerline if the images of the face and the trunk which originally should have the same centerline have different centerlines, e.g., only the image of the face is inclined.

SUMMARY OF THE INVENTION

In view of the foregoing observations and description, the primary object of the present invention is to provide an image processing method, an image processing system and a computer program for the purpose which can perform the trimming in a good balance.

In accordance with the present invention, there is provided an image processing method in which a trimmed image is obtained by carrying out trimming for cutting out from a photographic image obtained by taking a photograph of an object comprising a reference part, and one or more other part which, in a state where the object is not inclined, has a common centerline with the reference part and is arranged in a direction in which the centerline of the reference part extends, an image of an area including a part or the whole of the reference part and said other part along a trimming centerline at a predetermined angle to the centerline of the reference part, wherein the improvement comprises the steps of obtaining the centerline of the reference part and at the same time, detecting the degree of inclination of said other part and the direction thereof upon taking the photograph from the photographic image, determining said predetermined angle so that the trimming centerline is inclined by a larger angle away from the centerline of the reference part toward the direction of the inclination of said other part as the degree of inclination of said other part increases on the basis of the detected degree of inclination of said other part, and carrying out the trimming along a trimming centerline at the determined angle.

The "trimming centerline" as used here means the centerline of the area to be cut out upon trimming, and the trimmed image is an image laterally symmetrical about the trimming centerline.

The "inclination of said other part" means inclination of said other part relative to the reference part and the inclination of said other part includes not only those due to inclination of said other part upon taking the photograph but also those due to inclination of the reference part or both the reference part and said other part upon taking the photograph. Since the image processed by the method of the present invention is a photographic image of an object comprising a reference part, and one or more other part which has a common centerline with the reference part in a state where no part is inclined as an image of upper part of a person comprising a face and a trunk, the inclination of said other part relative to the reference part is equal to the inclination of the centerline of said other part to the centerline of the reference part.

It is preferred in the image processing method that the degree of importance of said other part be obtained and said predetermined angle be larger as the degree of importance of said other part increases.

The "degree of importance" means a degree to which much importance be attached to the direction of said other part relative to the reference part in the trimmed image.

The image processing method of the present invention can be applied to trimming of a photographic image of a face of a person. In this case, said object is formed by the upper half of the person, the reference part is formed by the face of the person, and said other part is formed by the trunk of the person.

In accordance with the present invention, there is provided an image processing system in which a trimmed image is obtained by carrying out trimming for cutting out from a photographic image obtained by taking a photograph of an object comprising a reference part, and one or more other part which, in a state where the object is not inclined, has a common centerline with the reference part and is arranged in a direction in which the centerline of the reference part extends, an image of an area including a part or the whole of the reference part and said other part along a trimming centerline at a predetermined angle to the centerline of the reference part, wherein the improvement comprises a reference part centerline obtaining means which obtains the centerline of the reference part from the photographic image, an inclination detecting means which detects the degree of inclination of said other part and the direction thereof upon taking the photograph from the photographic image, a trimming angle determining means which determines said predetermined angle so that the trimming centerline is inclined by a larger angle away from the centerline of the reference part toward the direction of the inclination of said other part as the degree of inclination of said other part increases on the basis of the detected degree of inclination of said other part, and a trimming means which carries out the trimming along a trimming centerline at the determined angle.

It is preferred that the image processing system of the present invention further comprises an importance degree obtaining means which obtains the degree of importance of said other part and said predetermined angle be larger as the degree of importance of said other part increases.

The image processing system of the present invention can be applied to trimming of a photographic image of a face of a person. In this case, said object is formed by the upper half of the person, the reference part is formed by the face of the person, and said other part is formed by the trunk of the person.

Further, it is preferred that the reference part centerline obtaining means obtains the positions of the eyes and obtains as the centerline of the reference part a straight line which passes the middle point between the eyes and is perpendicular to the straight line joining the eyes.

The inclination detecting means may detect the degree of inclination of the shoulders which are included in said trunk and may detect the degree of inclination of the trunk and the direction thereof on the basis of the difference between the degrees of inclination of the shoulders.

The image processing method of the present invention may be recorded in a computer-readable medium as a computer program for causing a computer to execute an image processing method of the present invention, and the computer-readable medium may be provided together with the computer program. A skilled artisan would know that the computer-readable medium is not limited to any specific type of storage devices and includes any kind of device, including but not limited to CDs, floppy disks, RAMs, ROMs, hard disks, magnetic tapes and internet downloads, in which computer instructions can be stored and/or transmitted. Transmission of the computer code through a network or through wireless transmission means is also within the scope of this invention. Additionally, computer code/instructions include, but are not limited to, source, object and executable code and can be in any language including higher level languages, assembly language and machine language.

In accordance with the image processing method and system of the present invention, when trimming a photographic image of an object comprising a reference part, and one or more other part which has a common centerline with the reference part in a state where no part is inclined as an image of upper part of a person comprising a face and a trunk, the inclination of said other part relative to the reference part is detected and the trimming centerline is obtained by inclining the centerline of the reference part according to the inclination of said other part instead of employing the centerline of the reference part as the trimming centerline as it is. Accordingly, when said other part is not inclined relatively to the reference part, both the reference part and said other part can be cut out not inclined and at the same time, when said other part is inclined relatively to the reference part, though an image of the reference part is somewhat inclined in the trimmed image, an image of said other part is not extremely inclined in the trimmed image, which permits the trimming to be performed in a good balance.

Further, since the centerline of the reference part can be inclined at an angle according to the degree of importance of the part, a trimmed image reflecting the kind of the image, the application of the trimmed image or the user's taste can be obtained.

BRIEF DESCRIPTION OF THE DRAWINGS

FIG. 3 is a block diagram showing the face detecting portion of the ID card making center shown in FIG. 2, FIG. 4 is a block diagram showing the eye detecting portion of the ID card making center shown in FIG. 2, FIGS. 5A and 5B are views for illustrating the positions of the eyes, FIG. 6A is a view showing the horizontal edge detecting filter, FIG. 6B is a view showing the vertical edge detecting filter, FIGS. 12A to 12C are views for illustrating rotation of faces, FIG. 13 is a flowchart showing learning of the reference data, FIG. 20 is a block diagram showing the structure of the trimming centerline setting portion in the ID card making center shown in FIG. 2, FIGS. 21A to 21C are views showing examples of the photographic images and the trimmed images.

DESCRIPTION OF THE PREFERRED EMBODIMENT

Figure 1:
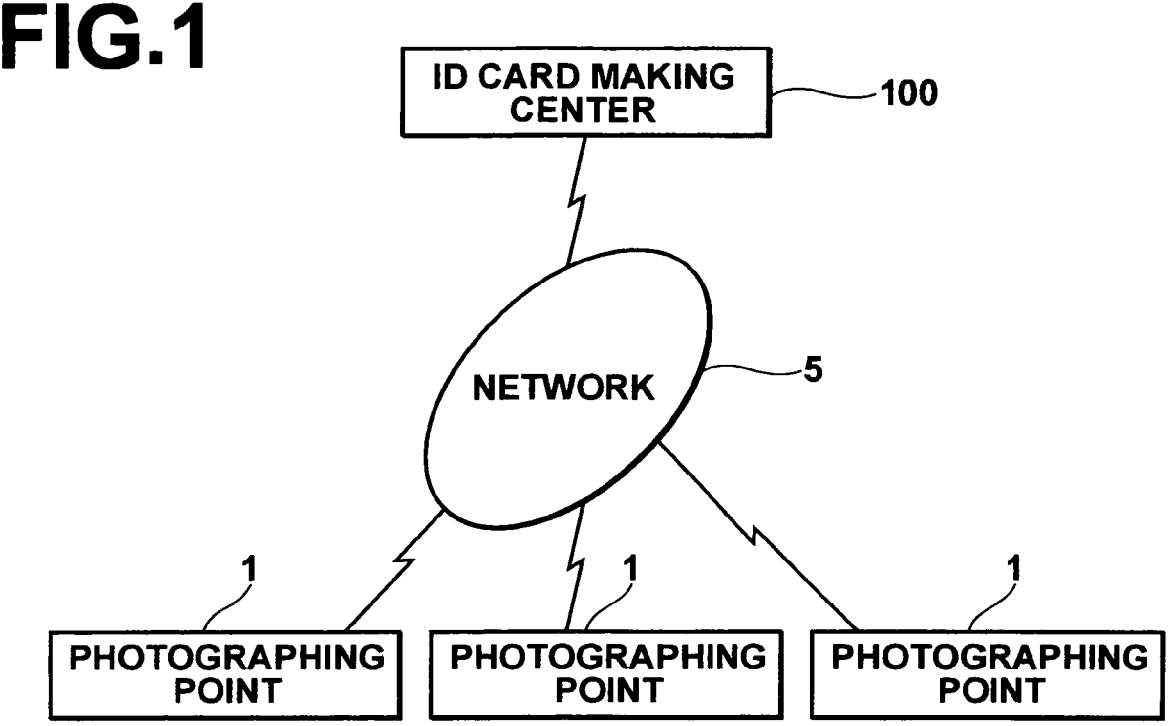
FIG. 1 is a block diagram showing an ID card issue system in accordance with an embodiment of the present invention.

FIG. 1 is a block diagram showing an ID card issue system in accordance with an embodiment of the present invention. In the ID card issue system of this embodiment, photographic images of the face obtained by photographing persons at various photographing points are sent to an ID card making center (will be described in detail later), in which trimming is carried out on the photographic images sent from the photographing points to obtain trimmed images, and ID cards with a photograph are made by the use of the trimmed images, and the trimming is executed by causing a computer (e.g., a personal computer) to perform the processing program read in an auxiliary storage means. The processing program is stored in a recording medium such as a CD-ROM or distributed by way of a network such as the Internet, and installed in the computer.

As shown in FIG. 1, the ID card issue system of this embodiment comprises a plurality of photographing points 1 at which persons are photographed and photographic images are obtained and an ID card making center 100 which makes ID cards with a photograph by the use of the face images obtained at the photographing points 1. The photographing points 1 and the ID card making center 100 are connected by way of a network 5, and the images are sent from the photographing points 1 to the ID card making center 100 are connected by way of the network 5.

Figure 2:
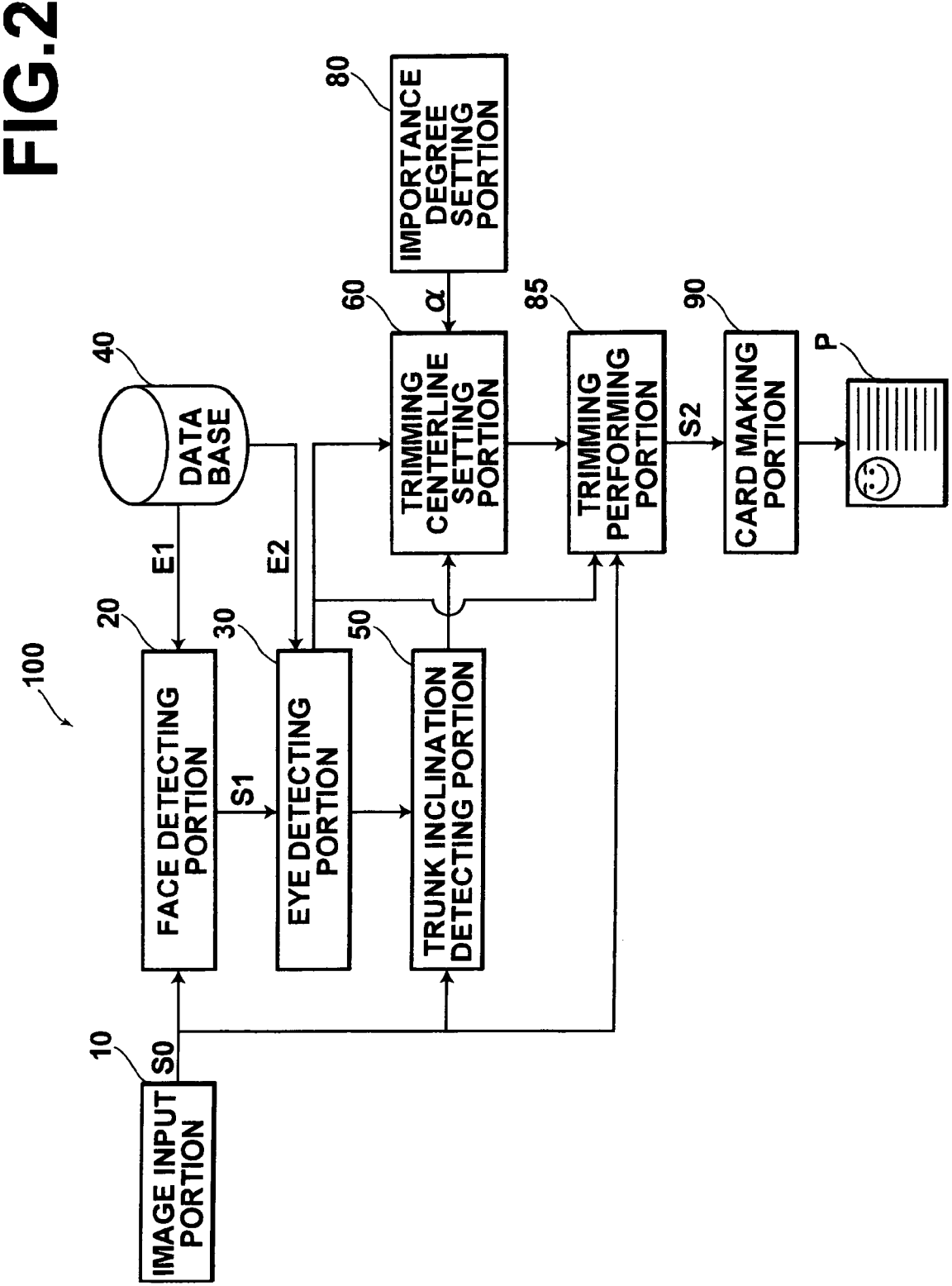
FIG. 2 is a block diagram showing the ID card making center in the embodiment shown in FIG. 1.

FIG. 2 is a block diagram showing the ID card making center 100.

As shown in FIG. 2, the ID card making center 100 comprises an image input portion 10 through which photographic images S0 are input, a face detecting portion 20 which detects the approximate position and size of the face in each of the images S0 from the image input portion 10 and obtains the image of the face S1 (will be referred to as "the face image S1", hereinbelow), an eye detecting portion 30 which detects the positions of the eyes in the face image S1, a database 40 which stores reference data E1 and reference data E2 which are used in the face detecting portion 20 and the eye detecting portion 30 as will be described later, a trunk inclination detecting portion 50 which detects the inclination of the trunk of the person photographed in the image S0, a trimming centerline setting portion 60 which sets a trimming centerline, on the basis of which the image S0 is trimmed, on the basis of the positions of the eyes detected by the eye detecting portion 30, the inclination of the trunk detected by the trunk inclination detecting portion 50 and a degree of importance a of the trunk set by an importance degree setting portion 80 to be described later, the importance degree setting portion 80, a trimming performing portion 85 which obtains a trimming area on the basis of the positions of the eyes detected by the eye detecting portion 30 and the trimming centerline set by the trimming centerline setting portion 60 and at the same time, cuts out the image of the obtained trimming area to obtain a trimmed image S2, and a card making portion 90 which makes an ID card with a photograph P by carrying out necessary enlargement/contraction, printing or the like on the trimmed image S2.

The image input portion 10 is for inputting the photographic images S0 to be processed by the ID card issue system of this embodiment and forms a receiving portion which receives the photographic images S0 sent by way of the network 5. The photographic images S0 to be processed by the image processing method and system of the present invention include not only the photographic images taken by a digital camera but also those printed on a printing medium such as a paper and a printing paper and those photoelectrically read images on photographic film by, for instance, a scanner.

FIG. 3 is a block diagram showing the face detecting portion 20 of the ID card making center 100 shown in FIG. 2. As shown in FIG. 3, the face detecting portion 20 comprises a first characteristic value calculating portion 22 which calculates a characteristic value C0 from the photographic images S0 and a face detection performing portion 24 which performs face detection by the use of the characteristic value C0 and the reference data E1 stored in the database 40. The reference data E1 stored in the database 40 and the face detecting portion 20 will be described in detail, hereinbelow.

Figure 7:
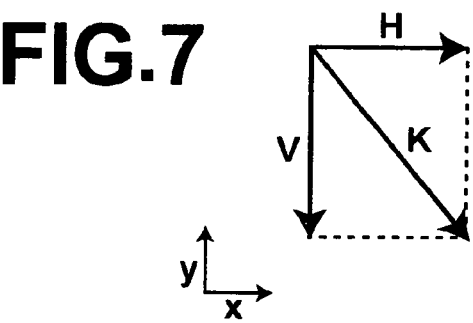
FIG. 7 is a view for illustrating calculation of a gradient vector.

The first characteristic value calculating portion 22 of the face detecting portion 20 calculates the characteristic value C0 from the photographic images S0. For example, the first characteristic value calculating portion 22 calculates gradient vectors as the characteristic value C0. Calculation of the gradient vectors will be described, hereinbelow. The first characteristic value calculating portion 22 first detects horizontal edges by carrying out on the images S0 filtering by the use of a horizontal edge detecting filter shown in FIG. 6A. Then the first characteristic value calculating portion 22 detects vertical edges by carrying out on the images S0 filtering by the use of a vertical edge detecting filter shown in FIG. 6B. The first characteristic value calculating portion 22 further calculates a gradient vector K for each pixel as shown in FIG. 7 on the basis of the size H of the horizontal edge and the size V of the vertical edge of each pixel on the images S0.

Figure 8A:
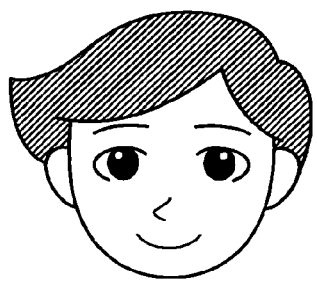
FIG. 8A is a view showing the face of a person.
Figure 8B:
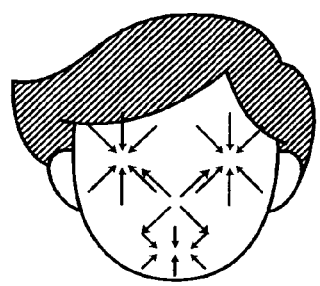
FIG. 8B is a view showing gradient vectors near the eyes and the mouth of the face of a person shown in FIG. 8A.

The gradient vectors K thus calculated, in the case of a face of a person as shown in FIG. 8A, are directed toward the center of an eye or a mouth in a dark part such as eyes or a mouth and are directed outward from the position of a nose in a light part such as a nose. Since the eye is larger than the mouth in change of density, the gradient vectors K are larger in the eye than in the mouth.

The direction and the size of the gradient vector are taken as the characteristic value C0, The direction of the gradient vector K is of a value of 0 to 359° with a predetermined direction (e.g., x direction in FIG. 7) taken as a reference.

Figure 9A:
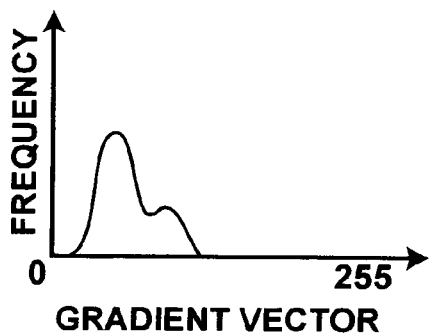
FIG. 9A is a view showing the histogram of the size of the gradient vector before normalization.
Figure 9B:
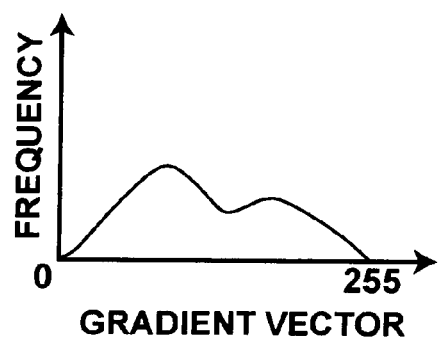
FIG. 9B is a view showing the histogram of the size of the gradient vector after normalization.
Figure 9C:
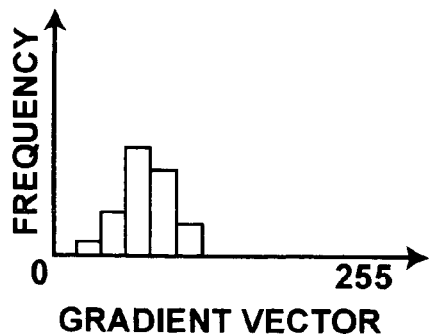
FIG. 9C is a view showing the histogram of the size of the five-valued gradient vector.
Figure 9D:
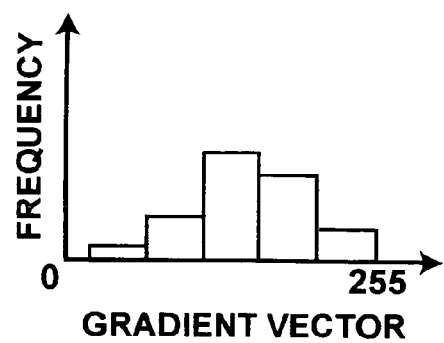
FIG. 9D is a view showing the histogram of the size of the five-valued gradient vector after normalization, FIG. 10 are views showing the sample images which have been known that they are the images of face and are used in learning the reference data E1, FIG. 11 are views showing the sample images which have been known that they are the images of face and are used in learning the reference data E2.

Then the size of the gradient vector K is normalized. The normalization is effected by obtaining a histogram of the sizes of the gradient vectors K of all the pixels in the images S0, smoothening the histogram so that the distribution of the sizes of the gradient vectors K are uniformed over the range of values which the pixels in the images S0 can take (0 to 255 in the case of 8 bit signals), and correcting the sizes of the gradient vectors K on the basis of the smoothening. For example, when the sizes of the gradient vectors K is small and the histogram thereof leans toward the smaller side as shown in FIG. 9A, the sizes of the gradient vectors K are normalized so that the sizes of the gradient vectors K are distributed over the entire range of 0 to 255 and the histogram is as shown in FIG. 9B. In order to reduce the amount of calculation, it is preferred that the distribution range of the gradient vectors in the histogram be divided into, for instance, five, and the gradient vectors be normalized so that the sizes of the gradient vectors K are distributed over the entire range of 0 to 255 in all the frequency distributions divided into five as shown in FIG. 9D.

The reference data E1 stored in the database 40 is obtained by defining the distinguishing conditions to a combination of the characteristic values C0 in each of the pixels forming each pixel group for each of a plurality of pixel groups comprising a combination of a plurality of pixels selected from sample images to be described later.

The distinguishing conditions to a combination of the characteristic values C0 in each of the pixels forming each pixel group in the reference data E1 have been determined in advance by learning a plurality of sample images which have been known that they are the images of face and a plurality of sample images which have been known that they are not the images of face.

Figure 10:
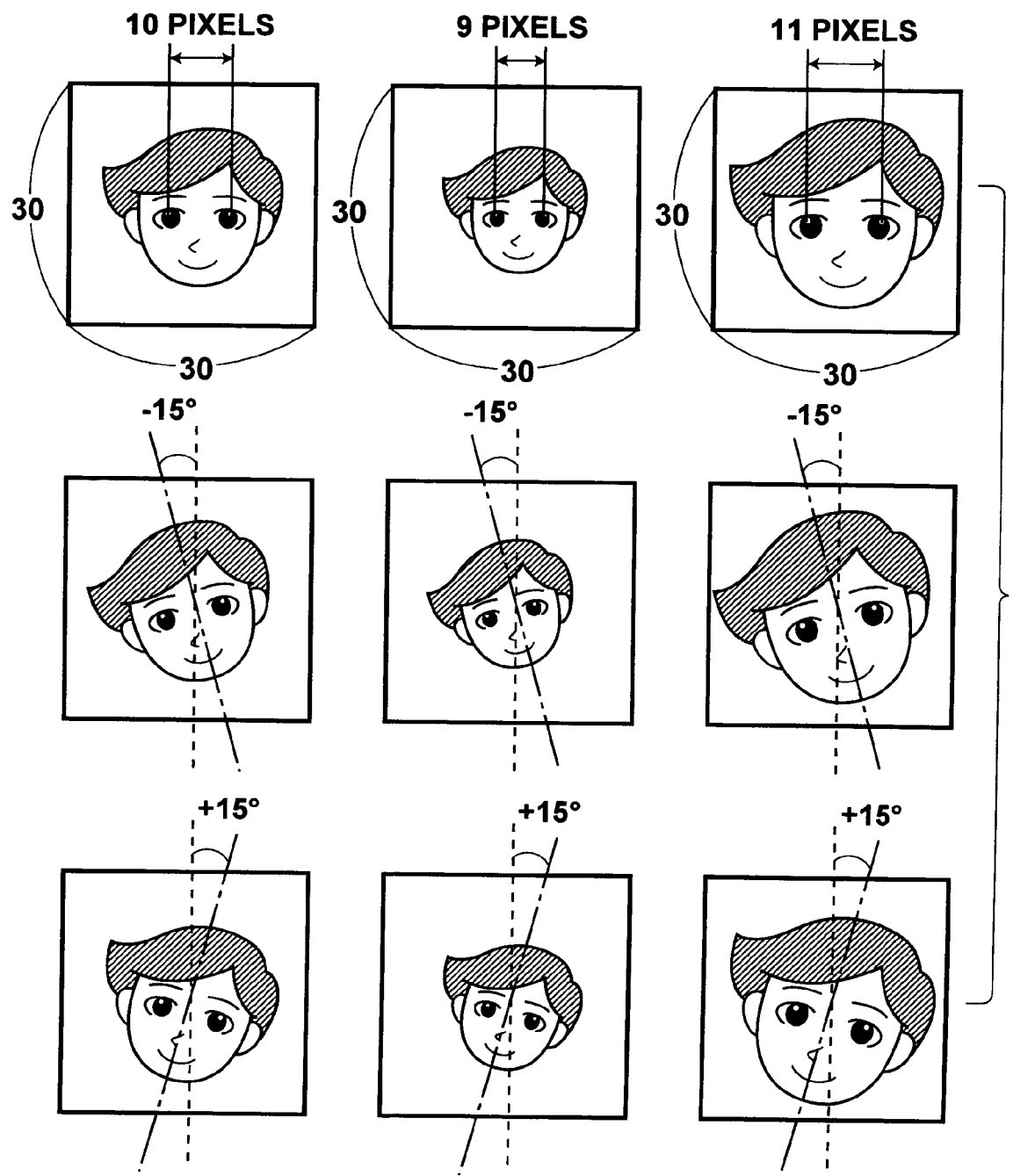
Figure 11:
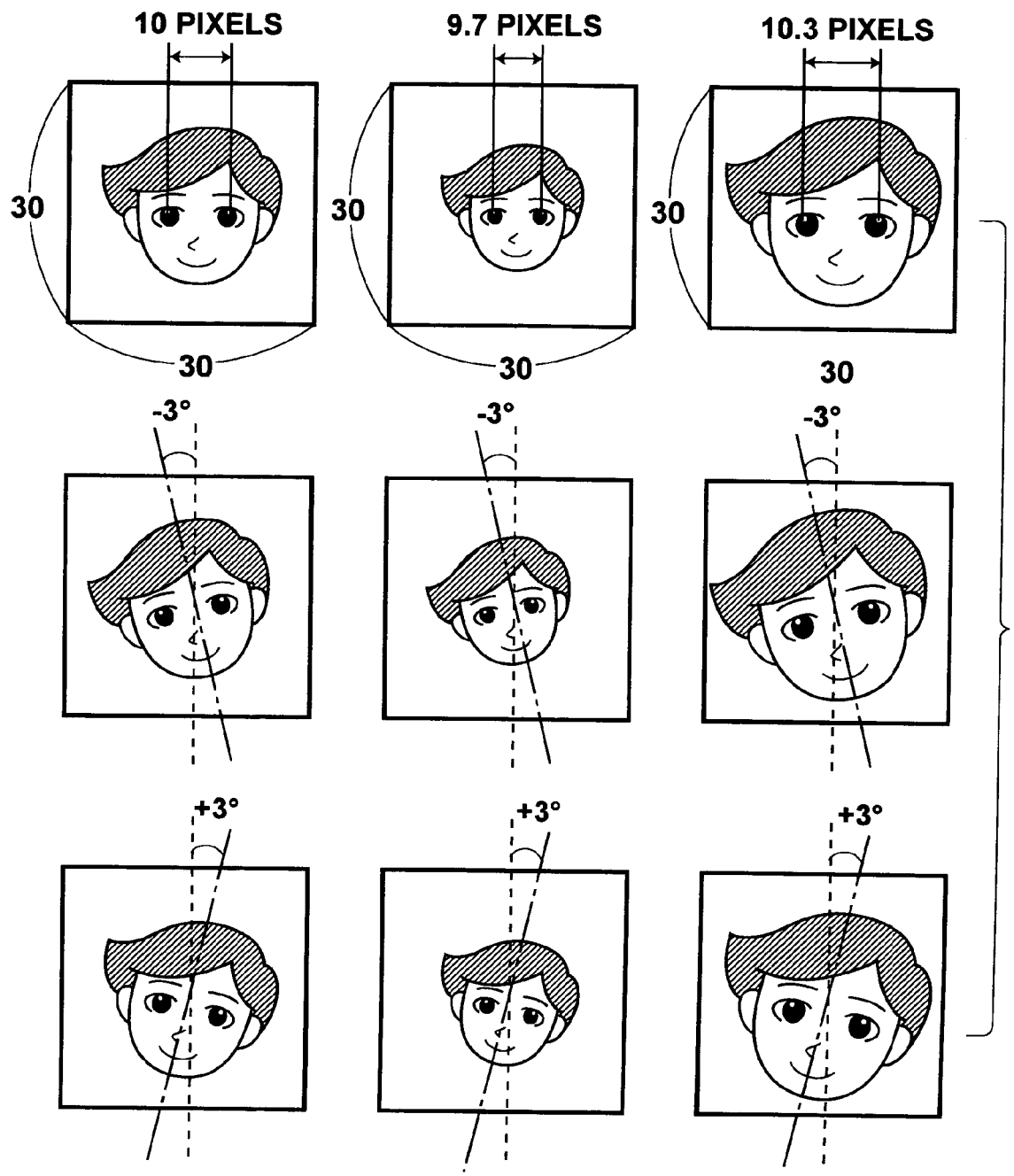

When the reference data E1 is generated in this embodiment, as the sample images which have been known that they are the images of face, sample images each of which has a size of 30×30 pixels, in which the center-to-center distances between the eyes are 10 pixels, 9 pixels, and 11 pixels and which are obtained by rotating the image of the face perpendicular to the straight line joining the centers of the eyes stepwise by 3° within ±15° in the plane (i.e., −15°, −12°, −9°, −6°, −3°, 0°, 3°, 6°, 9°, 12°, 15°) as shown in FIG. 10 are employed for each face. That is, 33 (3×11) sample images are prepared for each face. In FIG. 10, only the sample images obtained by rotating the image of the face perpendicular to the straight line joining the centers of the eyes by −15°, 0° and +15° in the plane are shown. The center of rotation is the intersection of the diagonal lines of the sample image. The centers of the eyes are the same in the case of the sample images in which the center-to-center distances between the eyes are 10 pixels. Coordinates of the centers of the eyes are taken as (x1, y1) and (x2, Y2) in the coordinate system having an origin on the upper left corner of the sample image. The positions of the eyes in the vertical direction (i.e., y1 and y2) are the same in all the sample images.

As the sample images which have been known that they are not the images of face, arbitrary sample images each of which has a size of 30×30 pixels are employed.

In the case where the sample images which have been known that they are the images of face, are 10 pixels in the center-to-center distances between the eyes and 0° in the rotational angle (that is, the images where the face is vertical) are learned, only the images of faces which are 10 pixels in the center-to-center distances between the eyes and are not rotated by any angle will be distinguished as a face image when the reference data E1 is referred to. The sizes of the face images which can be included in the photographic images S0 are not constant. Accordingly, the photographic images S0 are enlarged or contracted to distinguish a position of face which conforms in size to the sample images when determining whether a face image is included in the photographic images S0 as will be described later. However, in order to enlarge or contract an image so that the center-to-center distances between the eyes thereof is accurately 10 pixels, it is necessary to effect the distinguishment while the photographic images S0 is enlarged or contracted stepwise, for instance, by 1.1, which results in a vast amount of calculation.

The face images which can be included in the photographic images S0 can include not only the images where the face rotational angle is 0° as shown in FIG. 12A but also the images where the face is rotated as shown in FIGS. 12B and 12C. However, when the sample images which are 10 pixels in the center-to-center distances between the eyes and 0° in the rotational angle are only learned, the faces rotated as shown in FIG. 12B or 12C cannot be distinguished as a face.

Accordingly, in this embodiment, the sample images in which the center-to-center distances between the eyes are 9 pixels, 10 pixels, and 11 pixels and which are obtained by rotating the image of the face perpendicular to the straight line joining the centers of the eyes stepwise by 3° within ±15° in the plane as shown in FIG. 10 are employed as the sample images which have been known that they are the images of face so that the learning of reference data E1 has a tolerance. By this, when the face detection performing portion 24 to be described later effects the distinguishment, the photographic images S0 have only to be enlarged or contracted stepwise by 11/9 and accordingly the calculating time can be shortened as compared with when the photographic images S0 have to be enlarged or contracted stepwise by 1.1. Further, the faces which have been rotated as shown in FIG. 12B or 12C can be distinguished.

An example of learning the sample image group will be described with reference to the flow chart shown in FIG. 13, hereinbelow.

Figure 14:
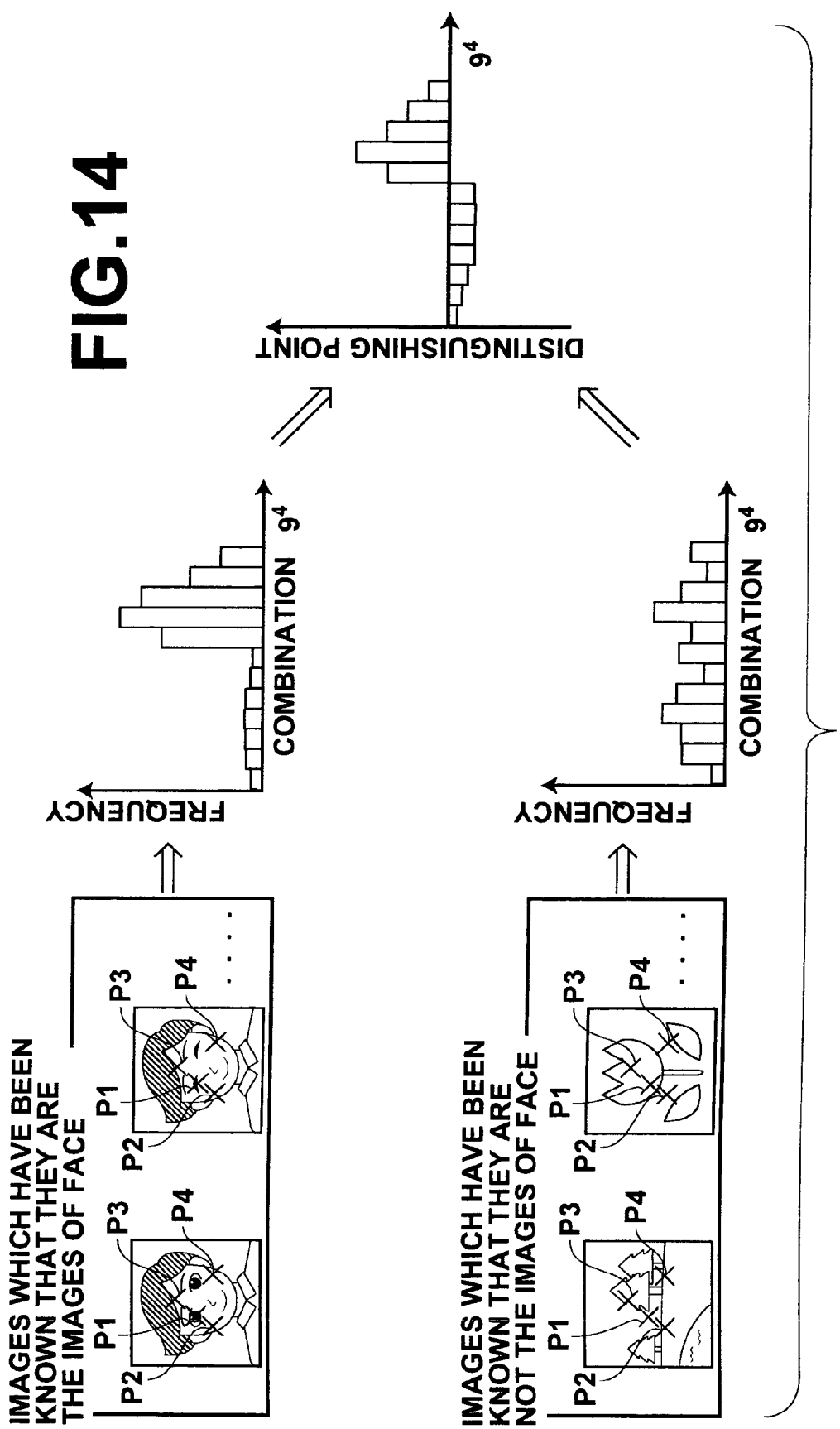
FIG. 14 is a view showing derivation of the distinguishers.

In FIG. 14, each of the pixels forming the distinguisher are a pixel P1 on the center of the right eye, a pixel P2 on the right cheek, a pixel P3 on the forehead and a pixel P4 on the left cheek of the sample images which have been known that they are the images of face as shown on the left side of FIG. 14. Then the combination of the characteristic values C0 on all the pixels P1 to P4 for all the sample images which have been known that they are the images of face, and the histogram thereof is made. Though the characteristic value represents the direction and size of the gradient vector K, since the direction of the gradient vector K is written in 360 (0 to 359) ways and the size of the gradient vector K is written in 256 (0 to 255) ways, the combination can be written in (360×256) ways per one pixel when they are used as they are. That is, the combination for 4 pixels can be written in $(360 \times 256)^4$ ways when they are used as they are and a vast number of samples, a long time and a vast number of memories are required. Accordingly, in this embodiment, the direction 0 to 359 of the gradient vector K is four-valued into a rightward direction (0 to 44 and 315 to 359, value 0), an upward direction (45 to 134, value 1), a leftward direction (135 to 224, value 2) and a downward direction (225 to 314, value 3) and the size of the gradient vector K is three-valued (values 0 to 2). Then the value of the combination is calculated according to the following formulae.

the value of the combination=0 (in the case where the size of the gradient vector=0)

the value of the combination=((the direction of the gradient vector+1)×the size of the gradient vector (in the case where the size of the gradient vector>0))

Since the number of combinations becomes $9^4$ with this arrangement, the number of pieces of data on the characteristic value can be reduced.

Similarly, a histogram is made for the sample images which have been known that they are not the images of face. In the case of the sample images which have been known that they are not the images of face, pixels corresponding to the positions of the pixels P1 to P4 on the sample images which have been known that they are the images of face are used. The histogram representing the logarithmic values of the ratio of the frequencies shown by the two histograms is the histogram which is shown on the rightmost side of FIG. 14 and used as the distinguisher. The value of the ordinate shown by each of the histograms of the distinguisher will be referred to as "the distinguishing point", hereinbelow. In accordance with the distinguisher, there is a strong probability that the images exhibiting a distribution of the characteristic values corresponding to a positive distinguishing point are images of face, and as the absolute values of the distinguishing point increases, the probability becomes stronger. Conversely, there is a strong probability that the images exhibiting a distribution of the characteristic values corresponding to a negative distinguishing point are not images of face, and as the absolute values of the distinguishing point increases, the probability becomes stronger. In step S2, on the basis of the combination of the characteristic values C0 on all the pixels forming a plurality of pixel groups which may be employed in the distinguishment, a plurality of the distinguishers in the form of a histogram are made.

Then, out of the distinguishers made in step S2, a distinguisher which is the most effective to distinguish whether the image is of a face is selected. This selection is effected taking into account the weights of the sample images. In this example, the ratio of the weighted correct answers of the distinguishers, and the distinguisher exhibiting the highest weighted correct answer is selected. (step S3) That is, since initially the sample images are equally weighted by 1, the distinguisher having the most sample images which are correctly distinguished as the image of face by the distinguisher is selected as the most effective distinguisher in the initial step S3. Whereas, in second step S3 after the weight of each sample image is updated in step S5 as will be described later, sample images whose weight is 1, sample images whose weight is larger than 1 and sample images whose weight is smaller than 1 mingle with each other and the sample image whose weight is larger than 1 is more counted than the sample whose weight is 1 in the evaluation of the ratio of the correct answers. By this, in steps S3 after the second step S3, a more importance is put on the sample images weighted more than the sample images weighted less.

Then whether the ratio of the correct answers of the combination of the distinguishers up to that time, that is, the ratio at which the result of distinguishment whether the sample images are images of face by the use of the distinguishers combined up to that time conforms to the answer whether the sample images are actually images of face, exceeds a predetermined threshold value is checked. (step S4) The sample images used here in the evaluation of the ratio of the correct answers may be the sample images with a current weight or the equally-weighted sample images. When the ratio exceeds the predetermined threshold value, the learning is ended since whether the images are of a face can be distinguished at a sufficiently high probability by the use of the distinguishers selected up to that time. When the ratio does not exceed the predetermined threshold value, the processing proceeds to step S6 in order to select one or more additional distinguisher to be combined with the distinguishers selected up to that time.

In step S6, in order for the distinguisher(s) selected in recent step S3 not to be selected again, the once-selected distinguisher(s) is omitted.

Then, the weight on the sample image which was not correctly distinguished whether it is an image of face in the preceding step S3 is increased and the weight on the sample image which was correctly distinguished whether it is an image of face in the preceding step S3 is reduced. (step S5) The reason why the weights are increased or reduced is that an importance is put on an image which was not correctly distinguished by the distinguishers which have been already selected so that a distinguisher which can correctly distinguish the image whether it is of a face, thereby enhancing the effect of the combination of the distinguishers. Thereafter, the processing returns to step S3 where the next most effective distinguishers are selected.

After distinguishers corresponding to the combination of characteristic values Co in each of the pixels forming a particular pixel group is selected as distinguishers which are suitable for distinguishing whether the image includes a face by repeating steps S3 to S6, the kind of the distinguishers and the distinguishing conditions used in distinguishment of whether the image includes a face are decided. (step S7) Then the leaning of the reference data E1 is ended.

When the learning procedure described above is employed, the distinguisher need not be limited to those in the form of a histogram but may be any so long as it provides data on the basis of which whether the image is of a face can be distinguished by the use of the combination of characteristic values Co in each of the pixels forming a particular pixel group, e.g., the distinguisher may be two-valued data, a threshold value or a function. Further, just the same, in the form of a histogram, a histogram representing the distribution of the difference between the two histograms shown at the middle of FIG. 14 may be employed.

Further, the learning procedure need not be limited to that described above but other machine learning procedures such as neural network may be employed.

The face detection performing portion 24 refers to the distinguishing conditions which the reference data E1 has learned for all the combinations of characteristic values Co in each of the pixels forming a plurality of pixel groups to obtain the distinguishing point of the combination of characteristic values Co in each of the pixels forming pixel groups, and detects a face on the basis of all the distinguishing points. At this time, the direction and the size of the gradient vector which are the characteristic value Co are four-valued and three-valued, respectively. In this embodiment, all the distinguishment points are summed and a face is detected on the basis of whether the sum is positive or negative, and of the magnitude of the sum. For example, when the sum of the distinguishment points is positive, it is determined that the image is of a face, whereas when the sum of the distinguishment points is negative, it is determined that the image is not of a face.

Figure 15:
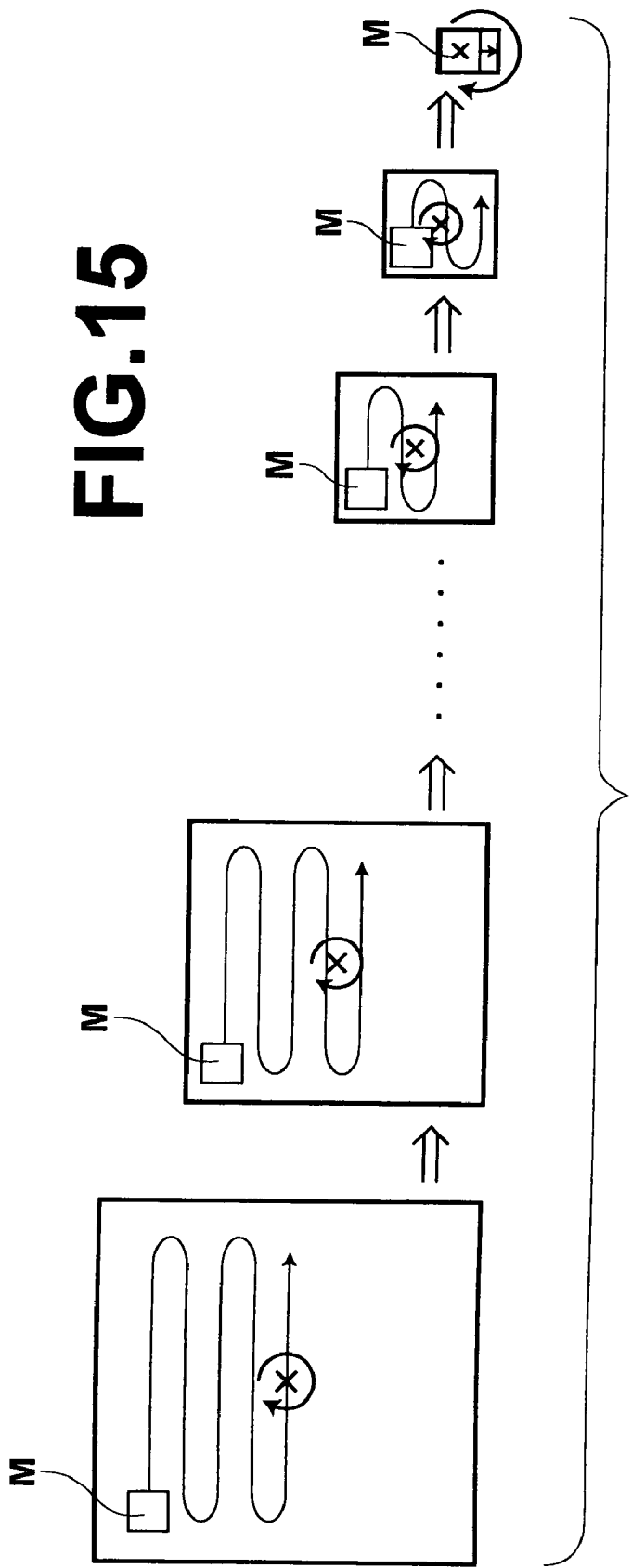
FIG. 15 is a view showing the stepwise deformation of the images to be distinguished.

The photographic images S0 can differ from the sample images of 30 pixels×30 pixels and can be of various sizes. Further, when the image includes a face, the face sometimes rotated by an angle other than 0°. Accordingly, the face detection performing portion 24, while enlarging or contracting the photographic image S0 until the vertical side or the horizontal side thereof becomes 30 pixels and stepwise rotating it through 360° in the plane (FIG. 15 shows a state where the image is contracted), sets a mask M of 30×30 pixels on the photographic image enlarged or contracted in each step, and distinguishes whether the image in the mask M is of a face (that is, whether the sum of the distinguishing points is positive or negative) while moving the mask M one pixel by one pixel on the enlarged or contracted photographic image S0 as shown in FIG. 15. This distinguishment is carried out on the photographic image C0 in all the steps of enlargement/contraction and rotation, and the area of 30×30 pixels corresponding to the position of the mask M at the detection is detected as a face area from the photographic image S0 of the size and the rotational angle in the step in which the sum of the distinguishing points is positive and the largest, and at the same time, the image in this area is extracted as a face image S1 from the photographic image S0.

Further, since the center-to-center distances between the eyes are 9, 10, or 11 pixels in the sample images employed when the sample images are learned to generate the reference data E1, the ratio of enlargement to enlarge or contract the photographic image S0 may be 11/9. Since in the sample images used in learning upon generation of the reference data E1, faces are rotated within ±15° in the plane, the photographic images S0 have only to be rotated through 360° 30° by 30°.

The first characteristic value calculating portion 22 calculates the characteristic value on each stage of deformation of the photographic images S0, e.g., enlargement/contraction or the rotation of the photographic images S0.

The face detecting portion 20 thus detects approximate positions and the sizes of the faces from the photographic images S0, and obtains the face images S1.

The eye detecting portion 30 detects the positions of the eyes from the face images S1 obtained by the face detecting portion 20 and FIG. 4 is block diagram showing the arrangement of the eye detecting portion 30. As shown in FIG. 4, the eye detecting portion 30 comprises a second characteristic value calculating portion 32 which calculates a characteristic value C0 from the face images S1 and an eye detection performing portion 34 which performs the eye detection on the basis of the characteristic value C0 and the reference data E2 stored in the database 40. The position of the eye to be distinguished by the eye detection performing portion 34 is the center between the outside corner of the eye and the inner side of the eye indicated at x in FIG. 5A or 5B. In the case of an eye looking right ahead, it is the same as the center of the pupil as shown in FIG. 5A whereas in the case of an eye looking rightward, it is in a position deviated from the center of the pupil or on the white of the eye.

Since being the same as the first characteristic value calculating portion 22 in the face detecting portion 20 shown in FIG. 3 except that it calculates the characteristic value C0 from the face images S1 instead of the photographic image S0, the second characteristic value calculating portion 32 will not be described in detail.

The second reference data E2 stored in the database 40 defines the distinguishing conditions, for each of a plurality of pixel groups comprising a combination of a plurality of pixels selected from the sample images to be described later, for distinguishing the combination of the characteristic value C0 of each of the pixels forming each of the pixel groups as the first reference data E1.

For learning of the second reference data E2, there are used sample images which are 9.7 pixels, 10 pixels and 10.3 pixels in the center-to-center distances between the eyes and are obtained by rotating the image of the face stepwise by 1° within ±3° in the plane. Accordingly, the second reference data E2 is narrow in the tolerance of learning as compared with the first reference data E1, and in accordance with the second reference data E2, the positions of the eyes can be detected more accurately. Further, since being equal to learning of the first reference data E1 except the sample pixel groups employed, the second reference data E2 will not be described here.

The eye detection performing portion 34 obtains, referring to the distinguishing conditions which the second reference data E2 has learned on all the combinations of the characteristic values C0 in the, the distinguishing point on the combination of each of the pixels forming each of the pixel groups and distinguishes the position of the eyes included in the face on the basis of all the distinguishing points. At this time, the direction and the size of the gradient vector K which are the characteristic values C0 are respectively four-valued and three-valued.

The eye detection performing portion 34, while stepwise enlarging or contracting the face image S1 obtained by the face detecting portion 20 and stepwise rotating it through 360° in the plane, sets a mask M of 30×30 pixels on the face image enlarged or contracted in each step, and detects the position of the eyes while moving the mask M one pixel by one pixel on the enlarged or contracted face image.

Further, since the center-to-center distances between the eyes are 9.07, 10, or 10.3 pixels in the sample images employed when the sample images are learned to generate the second reference data E2, the ratio of enlargement to enlarge or contract the photographic image S0 may be 10.3/9.7. Since in the sample images used in learning upon generation of the reference data E1, faces are rotated within ±3° in the plane, the face images S1 have only to be rotated through 360° 6° by 6°.

The second characteristic value calculating portion 32 calculates the characteristic value C0 on each stage of deformation, e.g., enlargement/contraction or the rotation of the face images S1.

Then, in this embodiment, all the distinguishing points are summed on all the stages of deformation of the face images S1, and in the image in the 30×30 pixel mask M on the stage of deformation where the sum is the largest, a coordinate system having its origin on the upper left corner is set. Then positions corresponding to coordinates (x1, y1) and (x2, y2) of the positions of eyes of the sample image are obtained and positions corresponding to the positions in the face image S1 before deformation are detected as the positions of the eyes.

The eye detecting portion 30 thus detects positions of the eyes from the face image S1 obtained by the face detecting portion 20.

Figure 16:
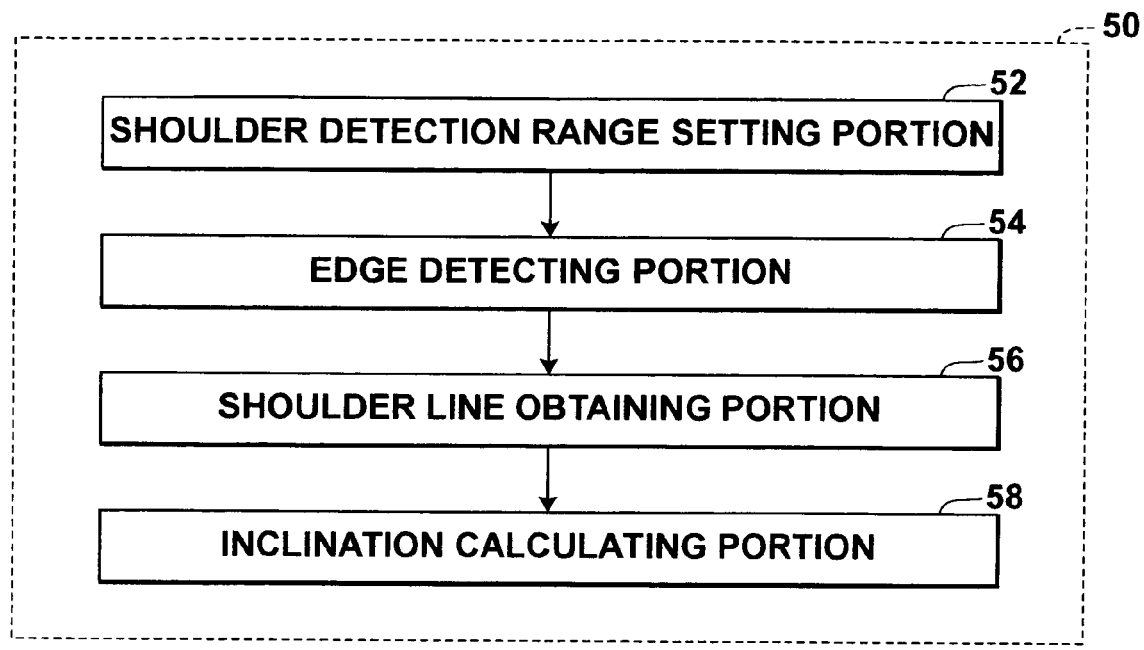
FIG. 16 is a block diagram showing the structure of the trunk inclination detecting portion in the ID card making center shown in FIG. 2.

The trunk inclination detecting portion 50 of the ID card making center 100 detects the inclination of the trunk of the person photographed in the image S0 relative to the image of the face on the basis of the positions of the right and left eyes detected by the eye detecting portion 30 and FIG. 16 is a block diagram showing the structure thereof. As shown in FIG. 16, the trunk inclination detecting portion 50 comprises a shoulder detection range setting portion 52, an edge detecting portion 54, a shoulder line obtaining portion 56 and an inclination calculating portion 58. The trunk inclination detecting portion 50 will be described in detail hereinbelow.

Figure 17:
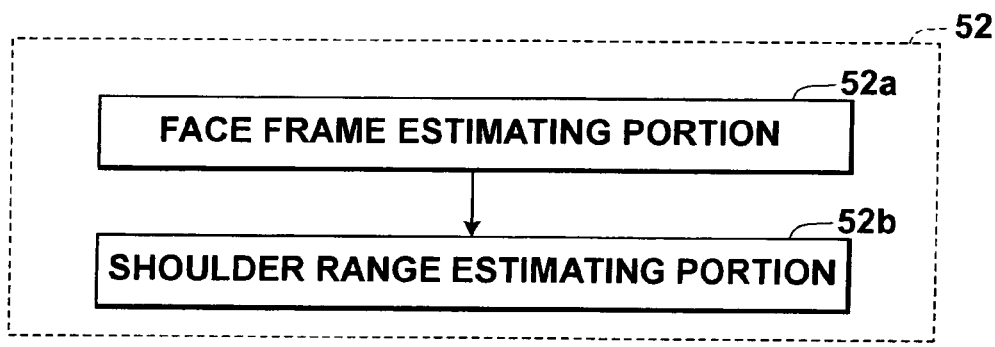
FIG. 17 is a block diagram showing the structure of the shoulder detection range setting portion of the trunk inclination detecting portion shown in FIG. 16.

As shown in FIG. 17, the shoulder detection range setting portion 52 comprises a face frame estimating portion 52a and a shoulder range estimating portion 52b. The face frame estimating portion 52a calculates a distance D between the right and left eyes on the basis of the positions of the eyes (A1 and A2) detected by the eye detecting portion 30 and estimates the frame (the frame shown by the dotted line in the example shown in FIG. 18) of the face circumscribing the face according to the following formulae (1).

Figure 18:
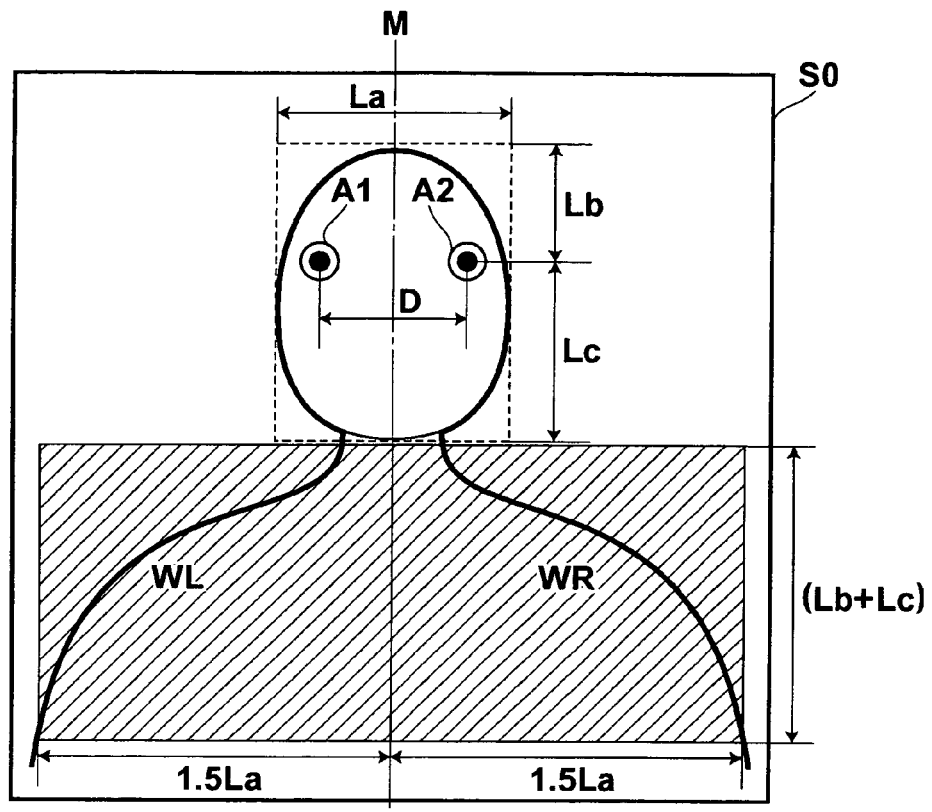
FIG. 18 is a view for illustrating the action of the shoulder detection range setting portion shown in FIG. 17.

$La = D \times Ua$ $Lb = D \times Ub$ $Lc = D \times Uc$ $Ua = 3.250$ $Ub = 1.905$ $Uc = 2.170$ wherein La, Lb and Lc respectively represent the width of the frame of the face having its center on the middle point between the eyes in each of the photographic images S0 as shown in FIG. 18. The coefficients Ua, Ub and Uc are of values empirically obtained from a number of sample images and are stored in a storage portion (not shown). . . . (1)

The shoulder range estimating portion 52b estimates a range over which an image of a shoulder is to be detected, that is, a range in which an image of a shoulder can exist (abbreviated to a shoulder range, hereinbelow.) on the basis of the frame of the face estimated by the face frame estimating portion 52a in the following manner in this example. The shoulder range estimating portion 52b first obtains a straight line (will be referred to as "the face centerline", hereinbelow) M which passes through the middle point between the eyes in perpendicular to a straight line joining the eyes. Then the shoulder range estimating portion 52b estimates as the range of the left shoulder an area WL which is adjacent to the frame of the face, has the face centerline M as a part of the right side and is 1.5×La in width and La+Lb in height and estimates as the range of the right shoulder an area WR which is adjacent to the frame of the face, has the right side of the area WL as the left side thereof, and is the same as the area WL in size. The "right" or "left" as used here are as seen from the side of viewer of the photographic images S0.

Then the shoulder detection range setting portion 52 outputs information representing the positions and the sizes of the ranges of the left and right shoulders WL and WR to the edge detecting portion 54.

Figure 19:
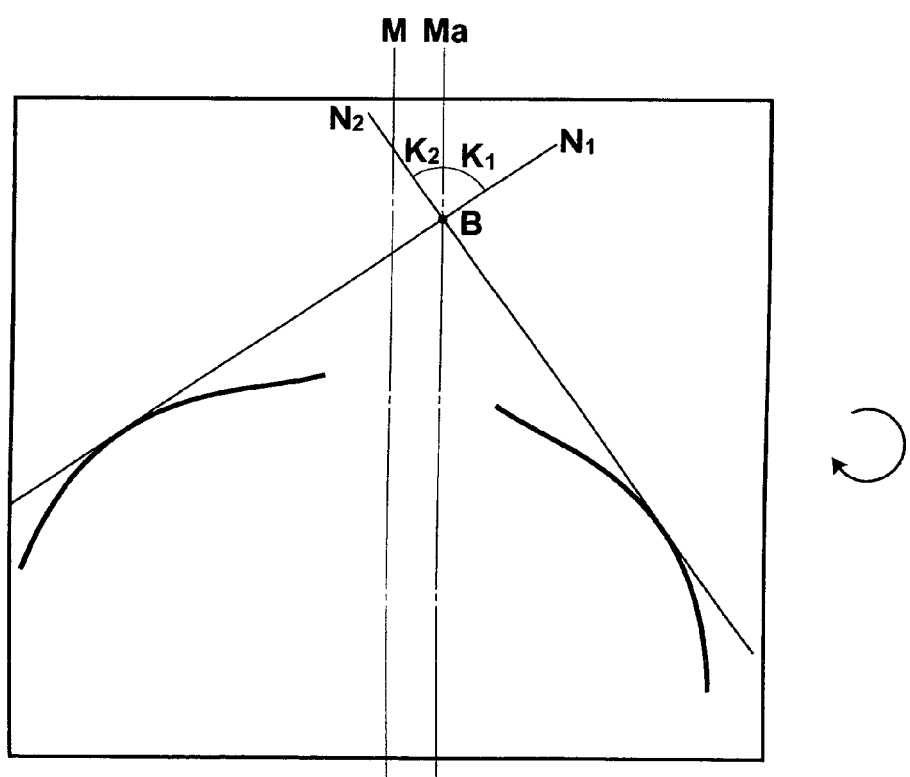
FIG. 19 is a view for illustrating the action of the inclination detecting portion shown in FIG. 16.

The edge detecting portion 54 carries out edge detection processing in the vertical direction (the direction in which the face centerline M shown in Figure extends) on the ranges of the shoulders WL and WR and removes the edges which are of the strength not larger than a predetermined threshold value, thereby detecting contour lines shown by the thick line in FIG. 19, that is, contour lines of the shoulders. The edge detecting portion 54 outputs information representing positions of pixels showing the contour lines to the shoulder line obtaining portion 56.

The shoulder line obtaining portion 56 carries out approximation by least square method on the two contour lines and obtains two straight lines N1 and N2 respectively as a left shoulder line and a right shoulder line.

The inclination calculating portion 58 calculates the inclination of the image of the trunk relative to the image of the face on the basis of the straight line obtained by the shoulder line obtaining portion 56. Specifically, the inclination calculating portion 58 first obtains the intersection B of the shoulder lines N1 and N2 and then obtains angles K1 and K2 which the shoulder lines N1 and N2 make with a line parallel to the face centerline M at the intersection B. In the photographic image S0, the angles K1 and K2 should be equal to each other when the image of the trunk is not inclined, and accordingly, the inclination calculating portion 58 calculates the inclination of the image of the trunk on the basis of the difference between the angles K1 and K2. The "inclination of the image of the trunk" means inclination of the image of the trunk relative to the face and the inclination of the image of the trunk includes not only those due to inclination of the image of the trunk upon taking the photograph but also those due to inclination of the face upon taking the photograph.

The inclination calculating portion 58 obtains the difference (K1−K2) between the angles K1 and K2, and calculates ½ of the absolute value of the difference as the degree of inclination of the trunk and obtains the direction of inclination on the basis of whether the difference (K1−K2) is positive or negative. For example, when the difference (K1−K2) is positive, that is K1>K2, the inclination calculating portion 58 determines that the inclination is in the clockwise direction and when the difference (K1−K2) is negative, that is K1<K2, the inclination calculating portion 58 determines that the inclination is in the counterclockwise direction. In the example shown in FIG. 19, the inclination is in the clockwise direction.

The inclination calculating portion 58 outputs the degree of inclination of the trunk and the direction of inclination thus obtained to the trimming centerline setting portion 60.

FIG. 20 is a block diagram showing the structure of the trimming centerline setting portion 60. As shown in FIG. 20, the trimming centerline setting portion 60 comprises a reference centerline calculating portion 62 which calculates a reference centerline and a centerline correcting portion 64 which obtains a trimming centerline by correcting the reference centerline.

Since the ID card issue system of this embodiment issues an ID card with a photograph, the reference centerline calculating portion 62 calculates a face centerline M such as shown in FIG. 21A as the reference centerline. The face centerline M is a straight line passing through the middle point Pm between the right and left eyes in perpendicular to a straight line joining the positions of the eyes, and may be newly obtained on the basis of the positions of the eyes detected by the eye detecting portion 30 or may be the face centerline M calculated when the shoulder range estimating portion 52b estimates the range of an image of a shoulder.

In the conventional trimming, since the trimmed image is obtained by taking the face centerline as the trimming centerline and cutting out the areas laterally symmetrical to the trimming centerline, in the case of a photographic image where the image of the trunk is inclined relative to the image of the face as shown in FIG. 21A, the inclination of the image of the trunk is prominent in the trimmed image (the part of the image in the dotted frame in FIG. 21C), and the trimmed image is not good in balance.

Accordingly, the trimming centerline setting portion 60 in the ID card making center 100 of the ID card issue system of this embodiment obtains a trimming centerline M' shown in FIG. 21B by correcting the face centerline M by the centerline correcting portion 64 according to the inclination of the image of the trunk detected by the trunk inclination detecting portion 50 and the degree of importance a of the trunk set by the importance degree setting portion 80. For example, a line obtained by rotating the face centerline M about the middle point Pm between the right and left eyes in the direction of the inclination is employed as the trimming centerline M'. The angle K by which the face centerline M is rotated is calculated according to the following formula (2).

$$K = \alpha \times |K1 - K2|/2, \ (0 \leq \alpha \leq 1) \quad (2)$$

wherein K represents the angle by which the face centerline M is rotated, K1 and K2 represent the angles which the shoulder lines make with the face centerline M, and a represents the degree of importance.

Further, in this embodiment, the importance degree setting portion 80 comprises an input means (not shown) through which the user inputs the importance degree of the trunk relative to the face, that is, the extent to which the face centerline M is to be corrected according to the inclination of the trunk when the trimming centerline M' is determined, and provides to the trimming centerline setting portion 60 the importance degree input by the user through the input means after transforming it to a value from 0 to 1.

The GUI (graphic user interface) which the importance degree setting portion 80 provides to the user may be any so long as it can input the importance degree α. For example, the importance degree α may be input by providing a slide bar in a display means such as a monitor and by causing the user to move a point on the slide bar with, for instance, a mouse. When there is no input by the user, it is assumed that a default importance degree (α=0) is input. In this case, the correction according to the inclination of the trunk is not executed.

The trimming centerline setting portion 60 outputs information representing the trimming centerline M' obtained by correcting the face centerline M by the centerline correcting portion 64 to the trimming performing portion 85. The trimming performing portion 85 sets a trimming area (the part of the image in the dotted frame in FIG. 21C) which is laterally symmetrical about the trimming centerline M' on the basis of the trimming centerline M' and at the same time, cuts out the image of the obtained trimming area to obtain a trimmed image S2.

The card making portion 90 makes an ID card with a photograph P by carrying out necessary enlargement/contraction on the trimmed image S2, and printing the processed image on an ID card.

Figure 22:
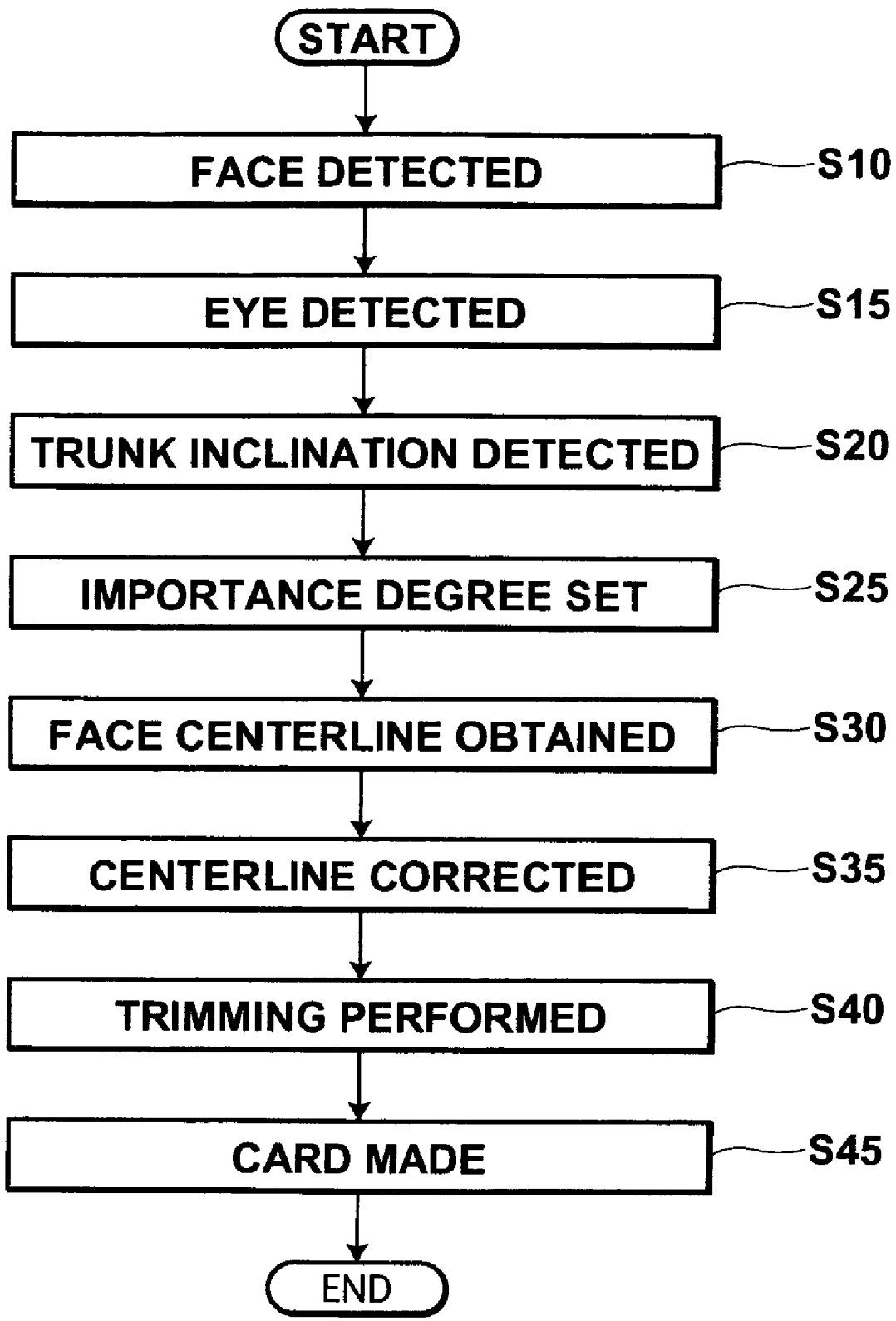
FIG. 22 is a flowchart showing the processing in the ID card making center shown in FIG. 2.

FIG. 22 is a flowchart for illustrating the processing in the ID card making center 100 of the ID card issue system of the embodiment shown in FIG. 1. As shown in FIG. 22, when photographic images S0 are input into the ID card making center 100 by the image input portion 10, the face detecting portion 20 carries out on the photographic images S0 processing for detecting a face to obtain the face image S1 (step S10) The eye detecting portion 30 detects the positions of the eyes from the face image S1 (step S15) and the trunk inclination detecting portion 50 sets the range over which an image of the shoulder is to be detected, detects the shoulders and calculates the shoulder lines on the basis of the positions of the eyes detected, as well as calculates the inclination of the trunk (the degree and the direction of the inclination) on the basis of the shoulder lines (step S20). The trimming centerline setting portion 60 obtains the face centerline M and at the same time, obtains a trimming centerline M' (steps S25, S30 and S35) by correcting the face centerline M according to the inclination of the image of the trunk and the degree of importance α of the trunk set by the importance degree setting portion 80. The trimming performing portion 85 sets a trimming area which is laterally symmetrical about the trimming centerline M' obtained by the trimming centerline setting portion 60 and cuts out the image of the obtained trimming area to obtain a trimmed image S2 (step S40). The card making portion 90 makes an ID card with a photograph P (step S45) by carrying out necessary enlargement/contraction on the trimmed image S2, and printing the processed image on an ID card.

As can be understood from the description above, in accordance with the ID card issue system of this embodiment of the present invention, the trimming centerline is obtained by correcting the centerline of the face (the reference part) according to the inclination of the trunk. Accordingly, when the trunk is not inclined relatively to the face, the trimmed image can be obtained without the face and the trunk inclined and at the same time, when the trunk is inclined relatively to the face, though an image of the face is somewhat inclined in the trimmed image, an image of the trunk is not extremely inclined in the trimmed image, whereby the trimmed image is good in balance.

Further, since the centerline of the face is corrected according to the degree of importance of the trunk, a trimmed image reflecting, for instance, the user's taste can be obtained.

Though, a preferred embodiment of the present invention has been described above, the image processing method and system and the computer program for the purpose need not be limited to the embodiment described above, but may be variously modified within the scope of the spirit of the present invention.

For example, though in the embodiment described above, a straight line perpendicular to a straight line joining the right and left eyes is obtained as the face centerline, the middle point between the eyes, the center point of a nose and the center point of a mouth may be obtained and a straight line joining these points may be employed as the face centerline as disclosed, for instance, in Japanese Unexamined Patent Publication No. 2003-092726.

Further, the methods of detecting the face, eyes, and shoulder need not be limited to the methods in the embodiment described above. For example, the user may be caused to designate the methods of detecting the face, eyes, and shoulder.

Further, the method of detecting the inclination of the trunk need not be limited to that where the shoulder lines are detected.

Further, the method of obtaining the trimming centerline by correcting the face centerline need not be limited to that described above where the face centerline is directly corrected so long as it can result in correction of the face centerline. For example, the outer ends of the respective right and left shoulders may be obtained so that a straight line which intersects first and second straight lines at the middle of the right and left eyes and intervenes between the first and second straight lines is obtained as the trimming centerline, the first straight line being a straight line passing through the middle between the eyes in perpendicular to a straight line joining the outer ends and the second straight line being a face centerline. In this case, the trimming centerline may be decided toward the first straight line as the importance degree of the trunk increases.

Further, though the face centerline is rotated about the middle between the eyes in the embodiment described above, the face centerline may be rotated about the center of a face or the upper part of the person. Further, the face centerline may be rotated about the center of the waist when the position of the waist can be known from the height of the chair as in the automatic photograph box.

Further, the objects comprise only the trunks and the faces since the objects to be processed are the photographic images in the ID card issue system of this embodiment, the image processing method and system of the present invention may be applied to trimming of the photographic images of objects comprising three or more parts, and the objects need not be limited to persons.

What is claimed is:

1. An image processing method in which a trimmed image is obtained by carrying out trimming for cutting out from a photographic image obtained by taking a photograph of an object comprising a reference part, and one or more other part which, in a state where the object is not inclined, has a common centerline with the reference part and is arranged in a direction in which the centerline of the reference part extends, an image of an area including a part or the whole of the reference part and said other part along a trimming centerline at a predetermined angle to the centerline of the reference part, wherein the improvement comprises:

a processor to perform the steps of:
obtaining the centerline of the reference part of the photographed object and at the same time, detecting a degree of inclination of said other part of the photographed object with respect to the centerline of the reference part and a direction of the inclination upon taking the photograph from the photographic image,
determining said predetermined angle so that the trimming centerline is inclined by a larger angle away from the centerline of the reference part toward the direction of the inclination of said other part as the degree of inclination of said other part increases on the basis of the detected degree of inclination of said other part, and
carrying out the trimming along a trimming centerline at the determined angle.

2. An image processing method as defined in claim 1 in which a degree of importance of said other part is obtained and said predetermined angle is larger as the degree of importance of said other part increases.

3. An image processing method as defined in claim 2 in which said object is formed by the upper half of a person, the reference part is formed by the face of the person, and said other part is formed by the trunk of the person.

4. An image processing method as defined in claim 1 in which said object is formed by the upper half of a person, the reference part is formed by the face of the person, and said other part is formed by the trunk of the person.

5. An image processing system in which a trimmed image is obtained by carrying out trimming for cutting out from a photographic image obtained by taking a photograph of an object comprising a reference part, and one or more other part which, in a state where the object is not inclined, has a common centerline with the reference part and is arranged in a direction in which the centerline of the reference part extends, an image of an area including a part or the whole of the reference part and said other part along a trimming centerline at a predetermined angle to the centerline of the reference part, wherein the improvement comprises:
a processor which provides:
reference part centerline obtaining means which obtains the centerline of the reference part from the photographic image,
inclination detecting means which detects a degree of inclination of said other part of the photographed object with respect to the centerline of the reference part and a direction of the inclination upon taking the photograph from the photographic image,
trimming angle determining means which determines said predetermined angle so that the trimming centerline is inclined by a larger angle away from the centerline of the reference part toward the direction of the inclination of said other part as the degree of inclination of said other part increases on the basis of the detected degree of inclination of said other part, and
trimming means which carries out the trimming along a trimming centerline at the determined angle.

6. An image processing system as defined in claim 5 further comprising an importance degree obtaining means which obtains a degree of importance of said other part and in which said predetermined angle is larger as the degree of importance of said other part increases.

7. An image processing system as defined in claim 6 in which said object is formed by the upper half of a person, the reference part is formed by the face of the person, and other part is formed by the trunk of the person.

8. An image processing system as defined in claim 5 in which said object is formed by the upper half of a person, the reference part is formed by the face of the person, and said other part is formed by the trunk of the person.

9. An image processing system as defined in claim 6 in which the reference part centerline obtaining means obtains positions of the eyes and obtains as the centerline of the reference part a straight line which passes a middle point between the eyes and is perpendicular to a straight line joining the eyes.

10. An image processing system as defined in claim 6 in which the inclination detecting means detects a degree of inclination of shoulders which are included in the trunk of a person and detects a degree of inclination of the trunk and a direction thereof on the basis of a difference between the degrees of inclination of the shoulders and the trunk.

11. An image processing system as defined in claim 7 in which the inclination detecting means detects a degree of inclination of the shoulders which are included in said trunk and detects a degree of inclination of the trunk and a direction thereof on the basis of a difference between the degrees of inclination of the shoulders and the trunk.

12. A non-transitory computer readable medium in which is recorded a computer program for causing a computer to execute an image processing method in which a trimmed image is obtained by carrying out trimming for cutting out from a photographic image obtained by taking a photograph of an object comprising a reference part, and one or more other part which, in a state where the object is not inclined, has a common centerline with the reference part and is arranged in a direction in which the centerline of the reference part extends, an image of an area including a part or the whole of the reference part and said other part along a trimming centerline at a predetermined angle to the centerline of the reference part, wherein the improvement comprises the steps of:
obtaining the centerline of the reference part of the photographed object and at the same time, detecting a degree of inclination of said other part of the photographed object with respect to the centerline of the reference part and a direction of the inclination upon taking the photograph from the photographic image,
determining said predetermined angle so that the trimming centerline is inclined by a larger angle away from the centerline of the reference part toward the direction of the inclination of said other part as the degree of inclination of said other part increases on the basis of the detected degree of inclination of said other part, and
carrying out the trimming along a trimming centerline at the determined angle.

13. A non-transitory tangible computer readable medium as defined in claim 12 in which a degree of importance of said other part is obtained and said predetermined angle is larger as the degree of importance of said other part increases.

14. A non-transitory tangible computer readable medium as defined in claim 13 in which said object is formed by the upper half of a person, the reference part is formed by the face of the person, and said other part is formed by the trunk of the person.

15. A non-transitory tangible computer readable medium as defined in claim 12 in which said object is formed by the upper half of a person, the reference part is formed by the face of the person, and said other part is formed by the trunk of the person.

16. The image processing method as defined in claim 1, wherein the determining said predetermined angle is performed after the taking of said photographic image.

17. The image processing system as defined in claim 5, wherein the trimming angle determining means determines said predetermined angle after the taking of said photographic image.

18. The non-transitory tangible computer readable medium as defined in claim 12, wherein the determining said predetermined angle is performed after the taking of said photographic image.

* * * * *